United States Patent [19]

Thomason

[11] Patent Number: 5,133,444
[45] Date of Patent: Jul. 28, 1992

[54] METHOD AND APPARATUS FOR SIMULTANEOUS TRANSFER OF WORKPIECES BETWEEN MULTIPLE STATIONS

[75] Inventor: David G. Thomason, Kennesaw, Ga.
[73] Assignee: Juki America, Inc., Duluth, Ga.
[21] Appl. No.: 525,452
[22] Filed: May 18, 1990
[51] Int. Cl.[5] ............................................. B65G 25/00
[52] U.S. Cl. .................. 198/345.1; 198/375; 198/468.2
[58] Field of Search ....... 198/345.1, 375, 468.2–468.5; 414/225, 226, 251–753; 29/33 P, 563, 791; 112/121.12, 121.15, 262.3

[56] References Cited

U.S. PATENT DOCUMENTS

| | | | |
|---|---|---|---|
| 3,075,651 | 1/1963 | Kaden | 198/468.2 |
| 3,601,393 | 8/1971 | Hawley | 198/468.4 |
| 4,754,863 | 7/1988 | Tsuchiya et al. | 198/468.2 |
| 4,921,387 | 5/1990 | Bennington | 914/225 |

Primary Examiner—Joseph E. Valenza
Attorney, Agent, or Firm—Morgan & Finnegan

[57] ABSTRACT

Multiple workpieces at various stages of manufacture are simultaneously transported, aligned, and processed along the assembly line. Separate workpiece transports are provided for a corresponding number of workstations that perform manufacturing operations on the workpieces. The workpiece transports are capable of movement in the X,Y and Z coordinate directions and can provide rotation in the X-Y plane. The workpiece transports are capable of movement in the X,Y and Z coordinate directions and can provide rotation in the X-Y plane. A workpiece removal component removes a finished workpiece to a storage or stacking area. The device may be used to manufacture either all left, all right, or both left and right version of the workpiece.

8 Claims, 4 Drawing Sheets

5,133,444

METHOD AND APPARATUS FOR SIMULTANEOUS TRANSFER OF WORKPIECES BETWEEN MULTIPLE STATIONS

BACKGROUND OF THE INVENTION

This invention relates to a method and apparatus for simultaneously transferring multiple workpieces to multiple workstations. More particularly, the invention relates to a method and apparatus for simultaneously transferring multiple shirt cuffs, shirt collars, or other components of wearing apparel to multiple workstations.

Prior to the automation of commercial scale apparel manufacturing lines, significant worker intervention was required to promote the flow of workpieces between the individual manufacturing workstations. A worker would be required to physically (manually) transport workpieces from a supply location to the individual workstations. Moreover, the worker would have to correctly position the workpieces at the workstations so that the manufacturing operations would be accurately performed. Such dependence on manual operation can be costly. The individual machines performing the various manufacturing operations are often capable of high output, efficiency, and accuracy but the efficieny of using these machines can be limited by the necessity of repeated manual intervention.

Due to the many steps required for such an operation, the manufacture of finished shirt cuffs is illustrative of an area where a high degree of labor cost has traditionally been felt. In such operations, the cuff must be aligned so that subsequent manufacturing operations will be accurately performed. The cuff must have a buttonhole and one or more buttons attached at opposing ends, with the buttons correctly opposing the buttonhole. Right and left versions of the cuff must be produced. Finally, the cuff must be transported off the assembly line to a storage area, awaiting final manufacture of the finished shirt. All this must occur in the context of numerous shirt cuffs, in various stages of manufacture, being processed simultaneously to make most efficient use and obtain the greatest output from an automated assembly line.

Thus, it will be seen that an automated assembly line must be capable of rapidly transporting multiple shirt cuffs in various stages of manufacture to various workstations.

Previous attempts to achieve the desired objectives have proven less than successful. Japanese Patent Application No. 63-64094, filed Oct. 31, 1988, assigned to Brother Company, discloses a device that employs a conveyor system for X coordinate movement of the workpiece. Two stationary positioning arms are used for y-coordinate movement, pickup, and rotation of the workpiece. The positioning arms must engage the cuffs from the moving conveyor at the same time that they seek to align and insert the piece at the desired workstation. This combination of processes greatly influences the cycle time of the device, causes workstation coordination difficulties, and contributes to problems in properly aligning the workpiece. Moreover, the drives used in the Brother device are electronically driven motors and controls, making the device complex and not cost effective.

It is therefore an object of the present invention to provide means and method for increasing the output of apparel manufacturing lines performing multiple operations on individual workpieces.

It is a further object of the present invention to provide means and method for simultaneously, rapidly and efficiently performing multiple manufacturing operations on multiple workpieces along an apparel manufacturing line.

A further object of the present invention is to provide one assembly for simultaneously performing numerous independent processes associated with manufacturing a finished component of wearing apparel.

SUMMARY OF THE INVENTION

These and other objects of the invention are met by providing an apparatus for simultaneously transporting multiple pre-aligned workpieces, in various stages of manufacture, and incorporating (X,Y) coordinate and rotary movement of the cuffs leading to a lower manufacturing cycle time and increased output for the assembly line. The individual workpieces can be placed at a predetermined (X,Y) reference coordinate, either manually or via some mechanical means, such as that disclosed by the co-pending application of the applicant hereof and Yoichi Enomoto, Ser. No. 07/526,668, filed the same day as the instant application entitled METHOD AND APPARATUS FOR WORKPIECE ALIGNMENT.

The invention can be provided along a work surface upon which are located a plurality of discrete work positions. The work positions may include a supply position wherein the invention engages a prealigned, blank workpiece, a button sewing position, a buttonhole forming position, and a stacking position wherein the finished workpieces are stored or packaged. The number and function of specific work positions can be varied according to the particular task contemplated.

Transport and rotation means are provided in preferred embodiments for taking the workpieces, at various tages of manufacture, from one work position to the following work position. The transport mechanism simultaneously transports and rotates the workpieces in the (X,Y) coordinate plane, if required, so as to avoid the difficulties associated with previous devices and to reduce the cycle time of the invention. A workpiece removal mechanism travels simultaneously with the workpiece transport means to remove the finished workpiece from the last work position to a storage or stacking area. Thus, in one configuration designed to process shirt cuffs, four simultaneous, independent operations—alignment of a blank cuff, two manufacturing processes on two individual cuffs, and removal of a finished cuff—allow four cuffs to exist in the system and to be processed by the invention at any given time.

BRIEF DESCRIPTION OF THE DRAWINGS

The invention will be described in greater detail below by way of reference to the following drawings, in which.

DESCRIPTION OF THE DRAWINGS

Figure 1:
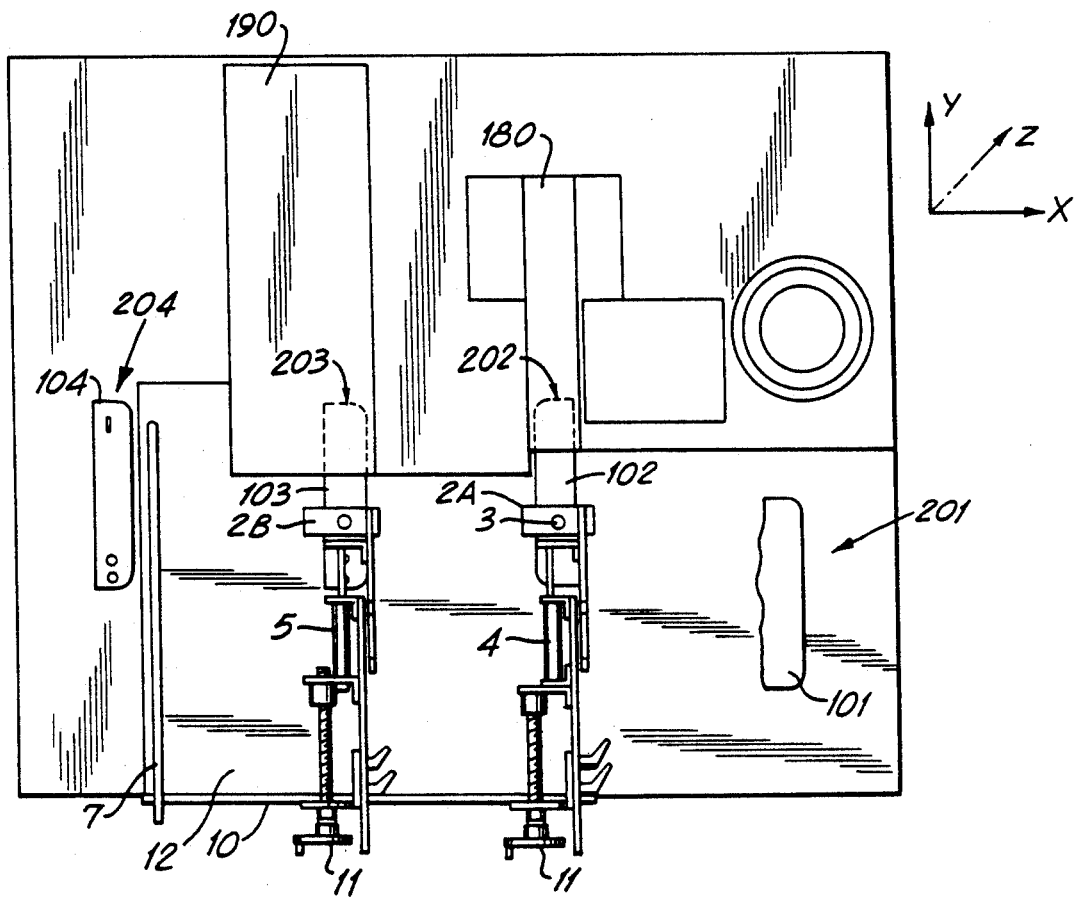
FIG. 1 is a top view of a preferred embodiment of the invention, showing the relationship of the various workpiece transport mechanisms and workpiece removal mechanisms, as well as a number of workpieces in various stages of manufacture located at designated work positions on the work surface.
Figure 2:
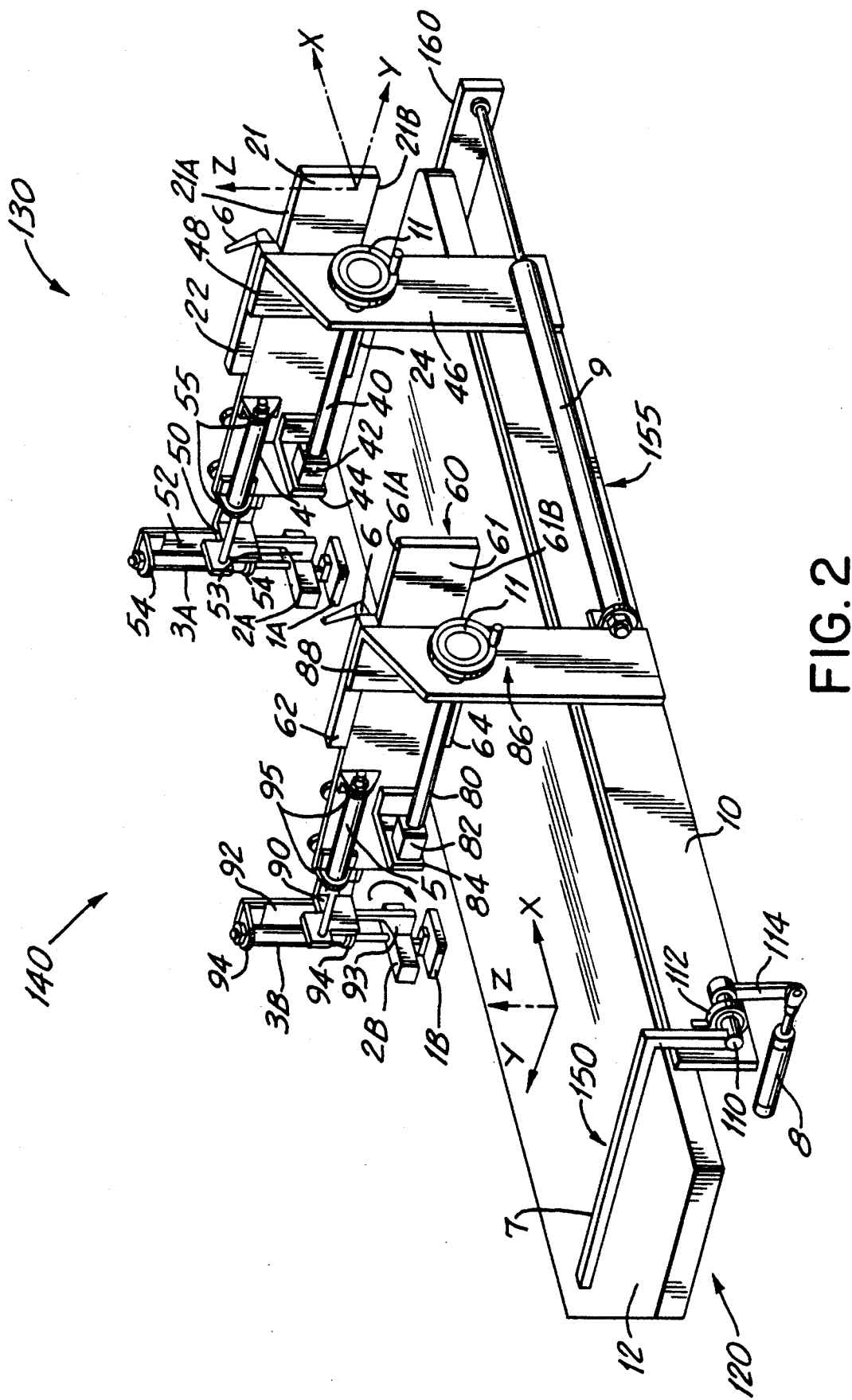
FIG. 2 is a side perspective view of the embodiment of FIG. 1, showing the various components.

Referring to FIGS. 1 and 2, one embodiment of the invention 120 broadly includes a first workpiece transport and positioning means 130, a second workpiece transport and positioning means 140, an X coordinate transport means 155, a workpiece removal means 150, and control means (not shown) for coordinating the motion and activity of the various components of the invention. The control means can comprise a PLC (programmable logic controller) or other general control system, but other types of computer, electronic, or mechanical controllers can be employed. A work surface 12 can be provided as the medium upon which individual workpieces 101, 102, 103, and 104 are positioned and transported to individual workstations 180 and 190.

Referring now to FIG. 1, workpiece 101 represents, for example, a prealigned cuff blank located at an (X, Y) coordinate reference position 201 on work surface 12. The cuff blank 101 is prealigned at said (X, Y) reference position 201 via manual or mechanical means, such as that disclosed by the co-pending application of the applicant hereof and Yoichi Enomoto, Ser. No. 07/526,668, filed the same day as the instant application, entitled METHOD AND APPARATUS FOR WORKPIECE ALIGNMENT. Of course, it is understood that a shirt cuff is only used as a representative example of the various apparel components or other workpieces that can be aligned by the apparatus and method disclosed herein.

Workpiece 102, having been previously prealigned at (X,Y) reference position 201, is subjected to a first manufacturing operation performed at location 202 on work surface 12. Workpiece 102 can represent a shirt cuff subjected to a buttoning operation, workstation 180 being, for example, a machine for attaching buttons to workpiece 102.

Workpiece 103 has been previously subjected to the manufacturing operation of workstation 180, and is now subjected to the manufacturing operation of workstation 190 at a location 203 on work surface 12. For example, workpiece 103 can represent a shirt cuff, having been previously subjected to the buttoning operation of workstation 180, that is now subjected to a buttonhole operation workstation 190 being, for example, a machine for forming bottonholes on workpiece 103.

Workpiece 104 represents, for example, a finished shirt cuff being removed from work surface 12 to some location (not shown) for storage or stacking.

One will note that the invention has the ability to transport workpieces simultaneously to a plurality of workstations so as to simultaneously perform multiple manufacturing processes on the workpieces. It will also be apparent that the invention is not limited to two workstations, but can include additional or fewer workstations that perform additional or fewer manufacturing processes. In such embodiments the invention can include additional or fewer transport means, with additional or fewer workpieces simultaneously present on work surface 12 during operation of the invention 120.

Turning now to FIG. 2, first workpiece transport and positioning means 130 serves to transport and position a workpiece 101 from its pre-alignment location 201 on work surface 12 to location 202 for processing by workstation 180. Similarly, second workpiece transport and positioning means 140 serves to transport and position workpiece 102 from location 202 to location 203 for processing by workstation 190, said workpiece having been previously subjected to the manufacturing operation of workstation 180 at location 202. Workpiece removal means 150 serves to remove and position a workpiece 103 having been previously subjected to the manufacturing operation of workstation 190, from location 203 to location 204 off of work surface 12.

First transport means 130 can be mounted on a support means 20 and may include a flat vertical support plate 46 having a flat side portion 48 perpendicularly oriented to support 46. Guide bars 22 and 24 are fixedly attached flush to the opposing top and bottom ends of side portion 48, the bars 22, 24 being horizontally oriented with respect to the Z coordinate axis and running parallel to the Y coordinate axis.

Support means 20 further comprises a sliding mounting plate 21, whose top edge 21A slides against the bottom edge of bar 22, and whose bottom edge 21B slides against the top edge of bar 24, so that sliding plate 21 slides parallel to the Y coordinate axis. The respective edges of plate 21 and bars 22 and 24 ma be configured to permit such sliding action, such as configuring edges 21A and 21B with U-shaped tongues and providing the bottom edge of bar 22 and the top edge of bar 24 with corresponding U-shaped grooves. Also, it is possible to place rails (not shown) along the length of edges 21A and B which engage rollers or bearings (not shown) fixed to the opposing edges of bars 22 and 24.

Generally, sliding plate 21 is immovably held with respect to bars 22 and 24 by securing means 6. This insures proper Y coordinate alignment of transport means 130. However, it may become necessary for the operator to adjust the Y coordinate alignment to accommodate larger (or smaller) workpieces or to correct the placement of the workpiece under workstation 180.

Thus, a mechanism is provided for operator controlled Y coordinate alignment. A bracket 44 may be mounted at the end of moving plate 21. A block 42, provided with a cylindrical threaded orifice (not shown), is mounted onto bracket 44. A threaded rod 40 engages the threaded orifice at one end, with the opposing end of rod 40 passing through an aperture (not shown) in support 46 and ultimately affixed to a handwheel Handwheel is rotatably fixed to support 46.

In order to re-align the transport means 130 in the Y coordinate axis, the operator first releases securing means 6, allowing plate 21 to freely slide between bars 22 and 24. Next, handwheel 11 is rotated, thereby causing threaded rod 40 to rotate within the threaded orifice of block 42, exerting a pulling or a pushing force upon plate 21 (depending upon which way handwheel 11 is rotated), and causing plate 21 to slide between bars 22 and 24 along the Y coordinate axis. When transport means 130 has been realigned, the operator reengages securing means 6, thereby holding plate 21 in place.

A stop (not shown) may be provided at the end of rod 40 to prevent it from disengaging from the orifice should the operator accidentally over-rotate handwheel 11. Of course, it is apparent that one could also rotatably affix an end of threaded rod 40 to block 42 or bracket 44, the other end of rod 40 passing through a threaded orifice on handwheel 11. Rotation of handwheel 11 will again exert pulling (or pushing) force on sliding plate 21, permitting Y coordinate alignment.

Moreover, the rod 40 could also be affixed to handwheel 11 but pass through threaded orifices in block 42 and bracket 44.

First transport and alignment means 130 is provided with Y coordinate actuation means 4, which can be a pneumatic cylinder having a sliding piston. Actuation means 4 could also employ hydraulic cylinders, but these are less desirable than pneumatic cylinders, which use air instead of messy fluids, an important concern when the workpieces are easily soiled.

The actuation means 4 is immovably fixed to sliding plate 21 via mounting brackets 55, so as to be horizontally aligned with respect to the Z coordinate axis and parallel to the Y coordinate axis. The sliding piston of actuation means 4 is fixed to an L-shaped plate 50 slidably attached to sliding plate 21. The sliding motion of plate 50 back and forth along the Y coordinate axis permits transport means 130 to transport and align a workpiece in the Y coordinate axis.

Another plate 52 can be fixed to plate 50. Actuation means 3A, preferably again a pneumatic cylinder having a sliding piston, is affixed to plate 52 by mounting brackets 54. Actuation means 3A allows transport means 130 to engage (and disengage) the workpieces against work surface 12. Actuation means 3A is preferably oriented parallel to the Z coordinate axis, e.g., it is perpendicular to the plane of work surface 12. A rotator 2A is attached to the free end of the piston, and is guided in its vertical travel along the Z coordinate axis by a bracket 53 fixed against rotator 2A and slidingly engaged with plate 50. Rotator 2A is typical of commercially available rotators, such as those made by Bimba, Part No. PT-006180.

A foam pressure pad 1A is rotatably mounted below rotator 2A. Pressure pad 1A exerts a light amount of pressure against a workpiece situated on work surface 12, causing rotator 2A to frictionally rotate the workpieces. Moreover, the friction caused by pad 1A allows for X and Y coordinate movement of the workpiece along work surface 12.

Second workpiece transport and alignment means 140 can be identical in construction to first workpiece transport and alignment means 130. Second transport means 140 serves to transport and position workpiece 102, having been previously subjected to the manufacturing process of workstation 180, from location 202 on work surface 12 to location 203 for processing by workstation 190.

The individual components of transport means 140 correspond to those described for transport means 130, and are numerically pointed out on FIG. 2. Briefly referring to FIG. 2, second workpiece transport means 140 has actuation means 5 for movement of foam pressure pad 1B in the Y-coordinate axis, and actuation means 3B for movement of pressure pad 1B in the Z-coordinate axis. The rotator 2B and pressure pad 1B rotate a workpiece in the X, Y coordinate plane on work surface 12, pad 1B sliding the workpiece in the (X, Y) plane across work surface 12. Again, actuation means 3B and 5 preferably comprise pneumatic cylinders.

Workpiece removal means 150 can be formed from an L-shaped bar 7 having a cylindrical shaft 110 at one end. The shaft 110 is rotatably engaged by a bracket 112 fixed to X-transport plate 10, whose function will shortly be explained. An actuator 8, also preferably a pneumatic cylinder, engages a bracket 114, one end of bracket 114 fixed to the sliding piston of actuator 8, and the opposing end affixed to shaft 110. The sliding action of the moving piston of actuator 8 causes bar 7 to rotate about the X coordinate axis. L-shaped bar 7 thus comes to rest against work surface 12 or is disengaged therefrom, depending on the whether actuator 8 is activated or deactivated. Note also that bar 7 can rest flush with work surface 12 when actuator 8 is activated, but is slidably movable thereon.

X coordinate transport means 155 can include X-transport . plate 10. X-transport plate 10 pulls or pushes transport means 130, transport means 140, and workpiece removal means 150 simultaneously in the X-coordinate direction. Plate 10, horizontally mounted alongside work surface 12, travels linearly parallel to the X-coordinate axis. The plate 10 can employ a sliding bearing and rail assembly, such as the commercially available linear motion bearing systems manufactured by THK or IKO, but other means are readily substituted.

Supports 46 and 86 are vertically attached to plate 10. Actuation means 9, preferably comprising a pneumatic cylinder having a sliding piston, is horizontally mounted to plate 10. The free end of the piston is attached to a fixed structure 160. As actuator 9 is activated, the piston extends and causes transport means 130, 140 and workpiece removal means 150 to simultaneously travel with plate 10 in the (−X) coordinate direction. Upon deactivation of actuator 9, the piston retracts, pulling plate 10 in the (+X) coordinate direction.

Operation of the invention is explained using FIGS. 2-5. The process begins with a blank cuff 101 being placed and aligned at location 201 upon work surface 12. As previously mentioned, the cuff 101 may be placed mechanically or manually. Transport means 130, 140 and workpiece removal means 150 can be coordinated to begin their work cycle simultaneously upon alignment of cuff blank 101.

The previously mentioned system controller makes a logic decision as to whether an aligned cuff 101 is present upon work surface 12. Simultaneous to the determination that an aligned cuff 101 is present, actuators 3A and 3B are activated, lowering pad 1A onto cuff blank 101 and pad 1B onto cuff 102 located at position 202 on worksurface 12. Recall that cuff 102 has previously been subjected to a manufacturing operation carried out by workstation 180. Upon full activation, actuators 3A and 3B cause pads 1A and 1B to exert a light pressure on their respective workpieces, resulting in a slight amount of friction of cuffs 101, 102 against work surface 12. This permits cuffs 101, 102 to travel across and rotate upon the (X, Y) plane of worksurface 12.

Simultaneous to full activation of actuators 3A and 3B, there is simultaneous activation of actuators 8 and 9 and rotator 2B while actuator 5 is simultaneously deactivated. Actuator 8 causes bar 7 to rest flush against work surface 12 at a position before engagement with the cuff 103 located at location 203. Recall that cuff 103 has just previously been subjected to a manufacturing operation carried out by workstation 190. Actuator 9 causes plate 10 to travel in the (−X) coordinate direction. The result is that bar 7 starts to sweep cuff 103 from location 203 to location 204 (wherein it is now referred to as finished cuff 104), location 204 representative of stacking or storing means. The sweep of cuff 103 from location 203 to location 204 is coordinated to coincide with the positioning of cuff 101 from location 201 to location 202, and the positioning of cuff 102 from location 202 to location 203

Figure 3:
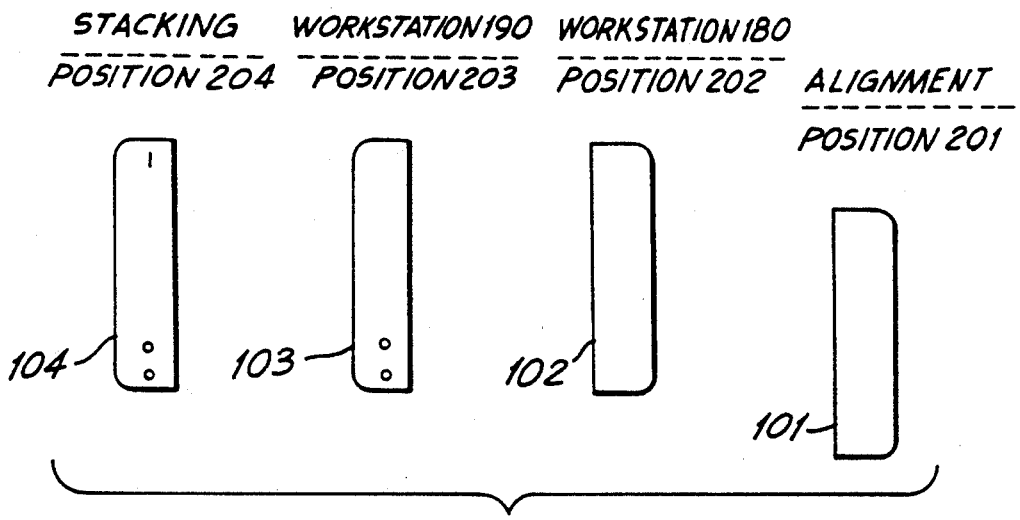
FIG. 3 represents the positional sequence for preparing a finished right cuff.
Figure 4:
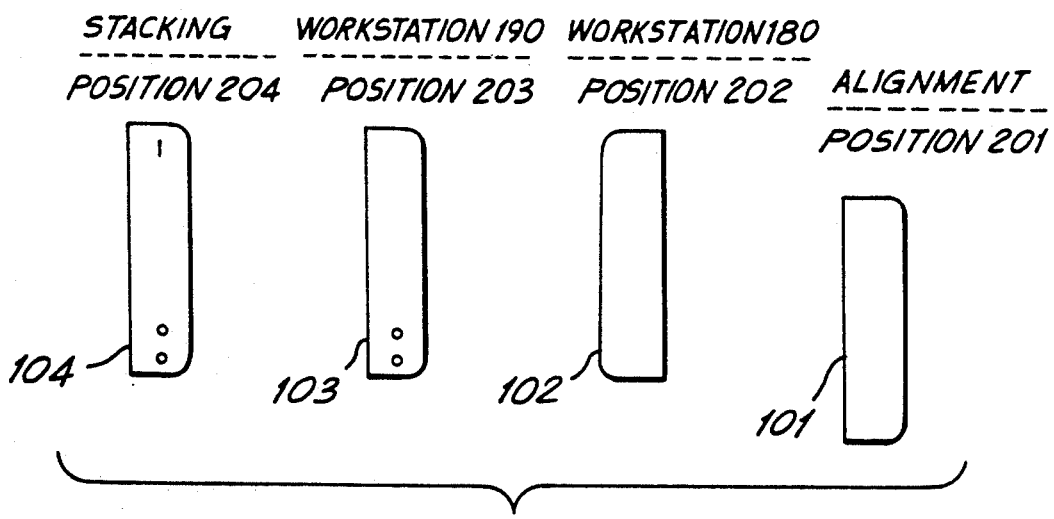
FIG. 4 represents the positional sequence for preparing a finished left cuff.
Figure 5:
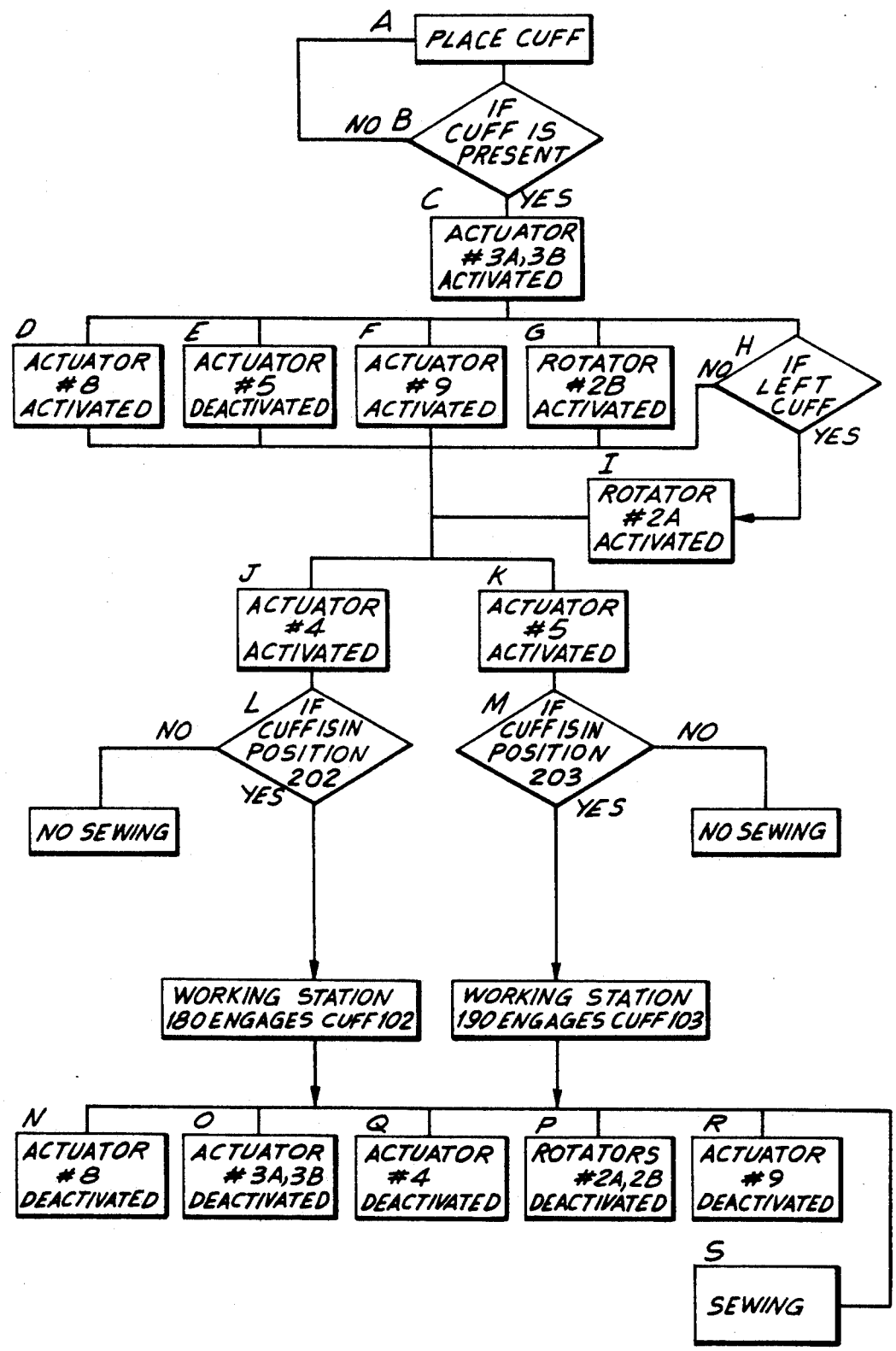
FIG. 5 is a process flow chart of the logical sequence of operations and decisions made by the components during the process of the invention.

Simultaneous to the movement of bar 7, pad 1B moves simultaneously in the −Y (because of the deactivation of actuator 5) and −X (because of activation of actuator 9) coordinate axes. This moves cuff 102 away from position 202 towards placement at position 203 for workstation 190 to perform its manufacturing operation upon the cuff. As cuff 102 is moved in the −Y and −X directions, rotator 2B rotates cuff 102 180° from its orientation at position 202 to its orientation at position 203. This movement and rotation is best viewed in FIGS. 3 and 4, FIG. 3 illustrating the positions for a right cuff, FIG. 4 for a left cuff. Note that regardless of left or right cuff, rotator 2B is activated to rotate cuff 102 at position 202 by 180° so that it is oriented as shown by cuff 103 at position 203.

Simultaneous to the aforementioned motion of bar 7 and pad 1B, pad 1A is moving cuff 101 in the X coordinate direction from position 201 to position 202. However, the invention 120 is able to produce either all right cuffs, all left cuffs, or both right and left cuffs. These are referred to as the sewing modes of the invention. Since all cuffs 101 are aligned in the same direction at position 201, rotation by pad 1A can allow the invention to operate in multiple sewing modes.

Thus, simultaneous to the movement of pad 1A in the (−X) direction, a logic decision is made by the system controller. As seen in FIGS. 3 and 4, all cuffs 101 are aligned in the same orientation regardless of whether they are left or right cuffs. However, a left cuff must be rotated 180° from the orientation at position 201 prior to placement at position 202. As seen in FIG. 4, if a left shirt cuff is being produced, the controller activates rotator 2A, rotating cuff 101 180° from its orientation at position 201 to its orientation (now being referred to as cuff 102) at position 202. This rotation of cuff 101 is occurring simultaneous to the movement of pad 1A in the X coordinate axis.

Note also that once cuffs 101, 102 and 103 have begun to move to locations 202, 203 and 204, a new cuff 101 is being prealigned at location 201, while the existing cuff at location 204 is being moved out of the system. Thus, in the depicted embodiment, four cuffs simultaneously exist in the system during each work cycle.

At this point in the work cycle, transports 130, 140 and workpiece removal means 150 have neared the end of their movement in the (−X) coordinate direction. Simultaneous to their arrival at their respective X coordinate locations, actuators 4 and 5 are activated. This causes pad 1B to move in the (+Y) coordinate direction and place cuff 103 in position 203 at workstation 190; simultaneously, pad 1A also moves in the (+Y) coordinate direction to place cuff 102 in position 202 at workstation 180.

Once cuffs 102 and 103 have arrived at their respective positions, workstations 180 and 190 engage their respective cuffs via clamps or other means (not shown) to hold cuffs 102 and 103 firmly against work surface 12, thereby preventing cuffs 102 and 103 from slipping or misaligning during the manufacturing operations performed by workstations 180 and 190.

Simultaneous to placement of cuffs 102 and 103 at positions 202 and 203, a logic decision is performed by the system controller to determine when cuffs 102 and 103 have been properly located at workstations 180 and 190. Upon the determination that cuffs 102 and 103 are properly placed, workstations 180 and 190 engage their respective cuffs at positions 202 and 203.

Now, actuators 8, 9, 3A and B, and 4, rotator 2B, and if previously activated, rotator 2A, are all simultaneously deactivated, while at the same time workstations 180 and 190 perform their respective operations on cuffs 102 and 103. The resultant activity is as follows. Pads 1A and 1B ascend from engagement of cuffs 102 and 103, which have been engaged by workstations 180 and 190, which are performing their manufacturing operations Simultaneously, pad 1A is moving in the −Y coordinate direction so that it will be aligned to engage workpiece 101 at alignment location 201 during the next manufacturing cycle. Note that actuator 5 remains activated because pad 1B should be positioned to engage cuff 102, located at position 202, during the next manufacturing cycle, actuator 5 being deactivated during the next manufacturing cycle to move cuff 102 away from workstation 180 so that cuff 102 can be rotated.

Simultaneously, bar 7 is being raised by the deactivation of actuator 8, so that bar 7 may pass over cuff 103 positioned at location 203. Bar 7 cannot remain flush with work surface 12 because it would engage cuff 103 as it is retreating in the (+X) coordinate axis and push cuff 103 towards previous workstations (e.g. 180) instead of towards location 204 for storage.

Simultaneous to all this, deactivation of actuator 9 causes plate 10 to be pulled in the (+X) coordinate direction, thereby moving transport means 130, 140 and workpiece removal means 150 into position for the next manufacturing cycle.

It will be apparent that other and further forms of the invention may be devised without departing from the spirit and scope of the appended claims, it being understood that this invention is not limited to the specific embodiments shown.

I claim:

1. An apparatus for simultaneously transporting and positioning multiple workpieces on a work surface at different manufacturing workstations, comprising:
    a first workpiece transport means capable of engaging a workpiece against said work surface, said transport means capable of three dimensional coordinate movement and 360° rotation of the workpiece in the X-Y plane upon said work surface; and
    a second workpiece transport means capable of engaging an additional workpiece against said work surface, said second transport means capable of three-dimensional coordinate movement and 360° rotation of the workpiece in the X-Y plane upon said work surface, said transport means traveling simultaneously with said first workpiece transport means in a common coordinate direction.

2. An apparatus according to claim 1, further comprising a workpiece removal means, said removal means slidingly engageable against said work surface for removing a workpiece from said work surface, said removal means traveling simultaneously with said first and second workpiece transport means in said common coordinate direction.

3. A process for simultaneously transporting and positioning multiple workpieces on a work surface at different manufacturing work stations, comprising the steps of:
    simultaneously engaging against said work surface, by use of a plurality of transport mechanisms capable of three-dimensional coordinate movement and 360° rotation in the X-Y plane of said work surface, a prealigned, blank workpiece and one or more workpieces at different states of finish;

simultaneously transporting said engaged workpieces with said transport mechanisms in a linear direction to succeeding workstations along said work surface while at the same time rotating one or more of said engaged workpieces in the X-Y plane of said worksurface;

simultaneously positioning said engaged workpieces at said succeeding workstations;

simultaneously engaging said workpieces by said workstations; and simultaneously disengaging said workpieces from said transport mechanisms while said workpieces remain engaged by said workstations.

4. The process of claim 3, further comprising the step of transporting a finished workpiece off said work surface to a stacking location while transporting said engaged workpieces to said succeeding workstations.

5. An apparatus according to claim 1, further comprising:

support means for supporting said first and second workpiece transport means; and drive means for driving said support means along said common coordinate direction.

6. An apparatus according to claim 1, wherein said first and second workpiece transport means further comprises actuation means for moving said first and second workpiece transport means perpendicular to said common coordinate direction.

7. An apparatus according to claim 2, further comprising:

support means for supporting said first and second workpiece transport means and said workpiece removal means; and drive means for driving said support means along said common coordinate direction.

8. A process according to claim 3, wherein each of said workpieces remains engaged by said transport mechanisms during the steps of transporting said workieces to and positioning said workpieces at said workstations.

* * * * *